United States Patent
Yamashita

(10) Patent No.: US 8,582,179 B2
(45) Date of Patent: Nov. 12, 2013

(54) IMAGE FORMING APPARATUS AND IMAGE FORMING SYSTEM FOR ADJUSTING A DENSITY OF A FORMED IMAGE BASED ON MEASURED DENSITIES OF A PRESCRIBED TEST IMAGE

(75) Inventor: Takashi Yamashita, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 320 days.

(21) Appl. No.: 13/081,782

(22) Filed: Apr. 7, 2011

(65) Prior Publication Data
US 2011/0222086 A1   Sep. 15, 2011

(30) Foreign Application Priority Data
Apr. 14, 2010   (JP) ................. 2010-093204

(51) Int. Cl.
*G06K 15/00*   (2006.01)
(52) U.S. Cl.
USPC ............ 358/2.1; 358/1.9; 358/3.23; 358/514; 358/518; 358/504; 399/184; 382/167
(58) Field of Classification Search
USPC .......... 358/1.9, 2.1, 3.23, 514, 518, 523, 524, 358/504; 399/180, 184; 382/167
See application file for complete search history.

(56) References Cited

U.S. PATENT DOCUMENTS 6,965,462 B1 * 11/2005 Henderson et al. ............ 358/504
2004/0012817 A1 * 1/2004 Brewington et al. ......... 358/3.06

FOREIGN PATENT DOCUMENTS

JP   2005-167550 A   6/2005

* cited by examiner

*Primary Examiner* — King Poon
*Assistant Examiner* — Jamares Q Washington
(74) *Attorney, Agent, or Firm* — Holtz, Holtz, Goodman & Chick, PC

(57) ABSTRACT

An image forming apparatus comprises: an image forming section that forms an image on a sheet; a density sensor that measures the image formed on the sheet and outputs a measured value corresponding to a density of the image; a conversion data storing section that stores plural conversion data showing relationship between the measured value outputted from the density sensor and the image density, for each sheet type and each screen for an image; a conversion data selection section that selects at least one conversion data from the plural conversion data stored in the conversion data storing section; and a density adjustment section that adjusts a density for an image formed by the image forming section based on a measured value acquired by measuring a prescribed image formed on a sheet and on the conversion data selected by the conversion data selection section.

11 Claims, 11 Drawing Sheets

| LED CHARACTERISTIC | RED LED | GREEN LED | BLUE LED |
|---|---|---|---|
| LUMINOUS INTENSITY (mcd) | 5500-9300 | 1200-21000 | 4200-7200 |
| WAVELENGTH (nm) | 620-640 | 528-536 | 464-472 |
| DIRECTIONAL CHARACTERISTICS | 15°(±7.5°) | 15°(±7.5°) | 15°(±7.5°) |
| OBJECT TO BE DETECTED | C,K | M | Y |

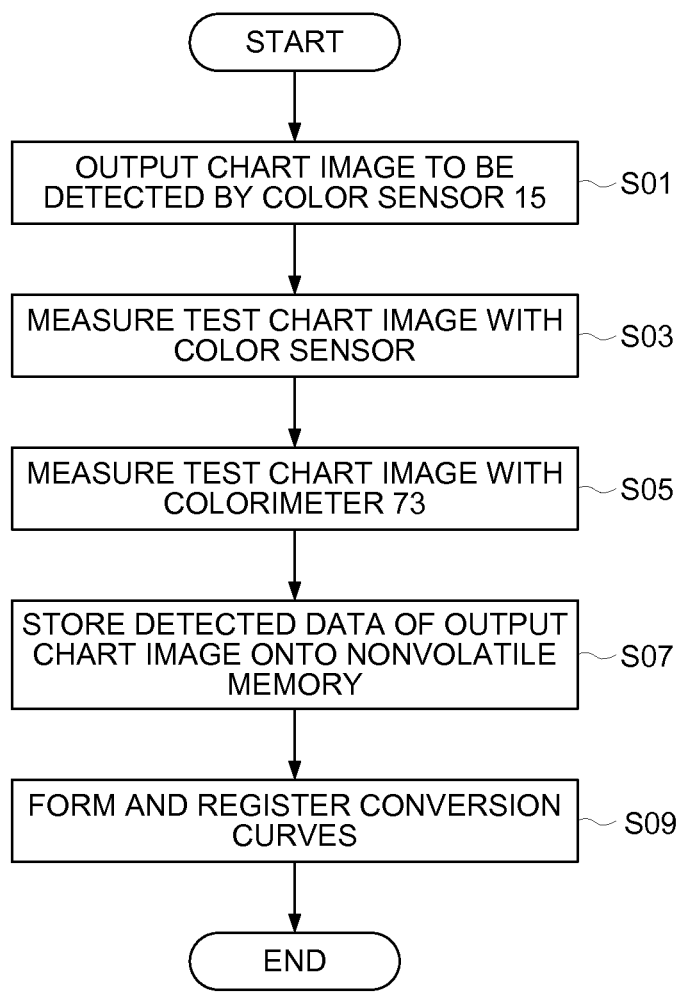

FIG. 3C

SHEET CATEGORY REGISTRATION | ADJUSTMENT | 2009/09/30 18:07

REGISTER DENSITY ADJUSTED VALUE IN ACCORDANCE WITH SHEET USED

SHEET CATEGORY LIST

| NO. | SHEET CATEGORY NAME | SETTING DATE |
|-----|---------------------|--------------|
| 01 | PAPER TYPE 01 | 2009/09/26 16:08 |
| 02 | PAPER TYPE 02 //WAITING STATE TO READ COLORIMETRIC DATA AS DENSITY DATA// | 2009/09/30 18:07 |
| 03 | | |
| 04 | | |
| 05 | | |
| 06 | | |
| 07 | | |
| 08 | | |
| 09 | | |
| 10 | | |

[READ COLORMETRIC DATA] [DELETE]

[TO PRINT MODE] [PREVIOUS SCREEN]

FIG. 4C

OUTPUT SHEET DENSITY MANUAL ADJUSTMENT | ADJUSTMENT | 2009/09/26 16:08

FORM OUTPUT SHEET DENSITY MANUAL ADJUSTMENT IN PRINT MODE

OUTPUT SHEET DENSITY MANUAL ADJUSTMENT WHICH HAS BEEN REGISTERED

| NO. | SHEET CATEGORY | SHEET TYPE | SCREEN | SETTING DATE |
|-----|----------------|------------|--------|--------------|
| 01 | DEFAULT | PLAIN PAPER | LINE 190 | 2009/09/26 16:06 |
| 02 | PAPER TYPE 01 | PLAIN PAPER | LINE 190 | 2009/09/26 16:08 |
| 03 | | | | |
| 04 | | | | |
| 05 | | | | |
| 06 | | | | |
| 07 | | | | |
| 08 | | | | |
| 09 | | | | |
| 10 | | | | |

1/2  DELETE

PREVIOUS PAGE  NEXT PAGE  TO PRINT MODE  PREVIOUS SCREEN

FIG. 5C

SETTING MENU

2009/08/31 14:41
SERIAL NUMBER: B13A0010000001
ADMINISTRATOR'S NAME
TELEPHONE NUMBER

DETERMINE SETTING WITH "OK",
CANCEL SETTING WITH "CANCEL" BUTTON

REGISTRATION OF SHEET CONDITIONS
SET OUTPUT SHEET DENSITY MANUAL ADJUSTMENT

OUTPUT SHEET DENSITY ADJUSTMENT

SETTING CHANGE

| SHEET TYPE | PLAIN PAPER |
| SHEET PROFILE NAME | |
| SHEET SIZE | 11x17 |
| BASIS WEIGHT | 64 - 74 g/m² |
| SHEET COLOR | WHITE |
| PUNCHING | NO |
| FRONT/BACK | NO CHANGE OF OFFSET |
| SPEED SETTING | 0 HUMIDIFICATION : ON |
| AIR BLOW | AUTO |
| THICKNESS | NO SPECIFIED |
| PROCESS ADJUSTMENT | NO CHANGE IN OFFSET |
| OUTPUT SHEET DENSITY ADJUSTMENT | PAPER TYPE 01 |

DEFAULT CORRECTION VALUE

SHEET CATEGORY
OFF

FILL IN GUIDANCE OF OUTPUT
SHEET DENSITY ADJUSTMENT

RESET   CANCEL   OK

IMAGE FORMING APPARATUS AND IMAGE FORMING SYSTEM FOR ADJUSTING A DENSITY OF A FORMED IMAGE BASED ON MEASURED DENSITIES OF A PRESCRIBED TEST IMAGE

This application is based on Japanese Patent Application No. 2010-093204 filed on Apr. 14, 2010, which is incorporated hereinto by reference.

BACKGROUND OF THE INVENTION

The present invention relates to an image forming apparatus employing an electrophotographic method, such as a copying machine, a printer and a facsimile machine, and to an image forming system having functions thereof.

In the aforesaid image forming apparatus and the aforesaid image forming system, there has been a problem wherein density of an image is changed by environmental changes in the course of printing and by fluctuations of apparatus characteristics, resulting in scattering of image qualities among a plurality of images printed under the same conditions.

For the aforesaid problem, in the case of a calibrating method disclosed in Japanese Patent Publication No. 4284520, when there are environmental changes in the course of printing or fluctuations of apparatus characteristics, a test image is formed on a sheet, then, the test image is measured by a color measuring sensor, and color proofreading processing is conducted based on the measured value, each time of the environmental changes and the fluctuations of the apparatus characteristics.

Incidentally, when conducting the color proofreading processing based on the measured value by the color measuring sensor, conversion data that show relationship between the measured value of the color measuring sensor and the image density are needed. These conversion data are changed in accordance with a screen that is selected according to a type of a sheet on which an image is formed and to an attribute of the image.

However, in the conventional color proofreading processing, the same conversion data are used even when the type of the sheet and a screen of the image are changed. Therefore, it is not possible to conduct appropriate density adjustment processing in accordance with a type of a sheet and with a screen of an image, because appropriate conversion data are not selected according to the sheet type and the screen for the image.

SUMMARY OF THE INVENTION

The present invention is one achieved in view of the aforesaid problems, and its object is to provide an image forming apparatus and an image forming system that conduct appropriate density adjustment processing in accordance with a type of a sheet and with a screen of an image.

The invention of the present patent application can be achieved by the following constituent requirements.

Item 1. To achieve at least one of the abovementioned objects, an image forming apparatus reflecting one aspect of the present invention comprises an image forming section that forms an image on a sheet, a density sensor that measures an image formed on the sheet and outputs a measured value corresponding to the density of the image, a conversion data storing section that stores plural conversion data showing relationship between a measured value outputted from a density sensor and image density, for each of sheet type and each of screen for an image, a conversion data selection section that selects at lease one conversion data from plural conversion data stored in conversion data storing section and a density adjustment section that conducts density adjustment for an image formed by the image forming section based on the measured value acquired by measuring prescribed image formed on a sheet and on the conversion data selected by the conversion data selection section.

Item 2. In the image forming apparatus in the aforesaid Item 1, it is desirable that the conversion data selection section selects conversion data that correspond to the sheet type and the image screen in the image forming processing received from the outside.

Item 3. In the image forming apparatus in the aforesaid Item 2, it is desirable that the image forming apparatus is equipped with a measured value data storing section that stores, for each type of sheet and each screen of an image, plural measured value data composed of measured values for each density outputted from the density sensor that measured images having prescribed density and with a measured value data selection section that selects at least one measured value corresponding to the sheet type and the image screen in the image forming processing received from the outside, from plural measured value data stored in the measured value data storing section, while, it is desirable that the density adjustment section conducts density adjustment based on measured value data selected by measured value data selection section and on the conversion data selected by the conversion data selection section.

Item 4. In the image forming apparatus in the aforesaid Item 1, it is desirable that the conversion data selection section selects conversion data designated by a user.

Item 5. In the image forming apparatus in the aforesaid Item 1, it is desirable that the image forming apparatus is further equipped with a conversion data registering section that registers the conversion data on the conversion data storing section, in the characteristics of the present invention. In this case, the image forming section forms a prescribed test image on a sheet by designating a sheet type and a screen for the image, then, the density sensor measures the prescribed test image, and further, a second density sensor measures the prescribed test image. Then, the conversion data registering section prepares a conversion data by causing the measured value outputted from the density sensor to correspond to the density value outputted from the second density sensor.

BRIEF DESCRIPTION OF THE DRAWINGS

FIG. 2A is a front view showing a concrete structural example of color sensor 15 arranged in relay unit RU in FIG. 1, while, FIG. 2B is a table in which characteristics of color sensor 15 are collected.

FIG. 3B is a flow chart showing operation procedures in the case of registering sheet category.

FIG. 3C shows an example of a display of an operation panel in the case of registering sheet category.

FIG. 4C shows an example of a display of an operation panel in the case of generating γ correction curve.

FIG. 5C shows an example of a display of an operation panel in the case of practicing a job.

DETAILED DESCRIPTION OF THE PREFERRED EMBODIMENT

Figure 1:
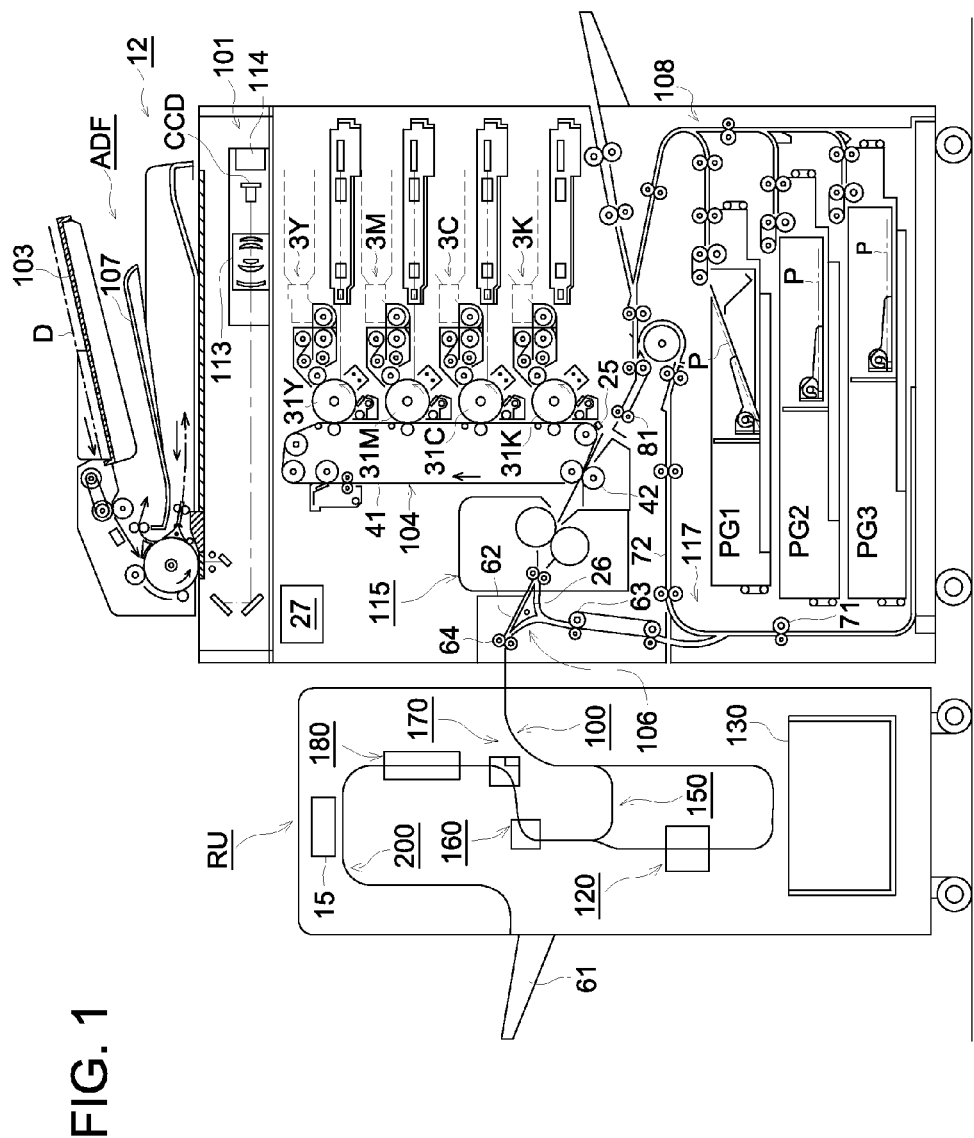
FIG. 1 is a front view showing a total structure of an image forming apparatus relating to an embodiment of the present invention.

An embodiment of the invention will be explained as follows, referring to the drawings. In the description of the drawings, the same parts are given the same symbols, and explanations for them are omitted.

The total structure of an image forming system relating to the embodiment of the invention will be explained, referring to FIG. 1. The image forming system relating to the embodiment is composed of image forming apparatus main body 12 that forms an image on a sheet and of relay unit RU that conducts a prescribed processing for the sheet on which an image has been formed.

The image forming apparatus main body 12 is one that is called a tandem type color image forming apparatus in which a plurality of photoconductor drums 31Y, 31M, 31C and 31K are arranged in the longitudinal direction to face intermediate transfer belt 41, and full-color images are formed.

The image forming apparatus main body 12 is equipped, on its upper part, with automatic document feeder ADF. Documents D placed on document platen 103 of the automatic document feeder ADF are separated into each sheet which is fed out to a document conveyance path, and is conveyed by a conveyance drum.

Document reading section 101 reads an image on document D that is in the course of its conveyance, in the position for reading images of the document. The first conveyance guide and a document ejection roller eject the document D which has been finished in terms of reading to document ejection tray 107.

The image forming apparatus main body 12 is composed of the document reading section 101, an exposure section, toner image forming sections 3Y, 3M, 3C and 3K, intermediate transfer section 104, fixing section 115, a sheet ejection reversing section, sheet-re-feeding section 117, sheet-feeding 108 and control section 27 which are housed in a single casing.

In the document reading section 101, an image on document D is illuminated by a lamp at a position for images on the document to be read, and its reflected light is guided by a first mirror unit, a second mirror unit and by lens 113, to form an image on a light receiving surface of image sensor CCD. The image sensor CCD conducts photoelectric conversion for incident light to output a prescribed image signals. Image reading control section 114 conducts processing such as A/D conversion, shading correction and compression, for the image signals, and stores them in a storage section of control section 27 as image data The image data stored in the storage section undergo appropriated image processing under the condition established by a user, and output image data are generated.

The exposure section is composed of an unillustrated semiconductor laser light source, a polygon mirror and of a plurality of lenses, to generate a laser beam. The exposure section conducts scanning exposure with a laser beam on surfaces of photoconductor drums 31Y, 31M, 31C and 31K which are charged by a main charging section, corresponding to output information outputted based on outputted image data sent from the control section 27.

For example, in the exposure section for Y color use, a laser beam is caused to conduct deflection scanning by rotating a polygon mirror for Y color use. This is the so-called writing in the main scanning direction of Y color image data. The main scanning direction is a direction that is in parallel with an axis of rotation of photoconductor drum 31Y. The photoconductor drum 31Y rotates in the sub-scanning direction. The sub-scanning direction is a direction that intersects the axis of rotation of photoconductor drum 31Y at right angles. When this photoconductor drum 31Y rotates in the sub-scanning direction, and when the laser beam is caused to do deflection scanning in the main scanning direction, an electrostatic latent image for Y color use is formed on photoconductor drum 31Y. Even for M color, C color and BK color, electrostatic latent images for M color, C color and BK color are formed on photoconductor drums 31M, 31C and 31K on the same way as in the foregoing, by causing a laser beam to scan in the direction (main scanning direction) that is in parallel with an axis of rotation of each of photoconductor drums 31M, 31C and 31K which rotate.

Toner image forming section 3Y is composed of photoconductor drum 31Y and of some items which are arranged on the surroundings of the photoconductor drum 31Y including a main charging section, a developing section, a first transfer roller and a cleaning section. In other toner image forming sections 3M, 3C and 3K, the structures are the same as the structure of the toner image forming section 3Y, and a main charging section, a developing section, a first transfer roller and a cleaning section are arranged corresponding to each of them, on the surroundings of respective photoconductor drums 31M, 31C and 31K.

The developing section visualizes a latent image on each of photoconductor drums 31Y, 31M, 31C and 31K by developing with toners for yellow (Y), magenta (M), cyan (C) and black (BK). Owing to this, a toner image for yellow (Y) is formed on photoconductor drum 31Y, a toner image for magenta (M) is formed on photoconductor drum 31M a toner image for cyan (C) is formed on photoconductor drum 31C and a toner image for black (BK) is formed on photoconductor drum 31K.

A first transfer roller of intermediate transfer section 104 transfers a toner image formed on each of photoconductor drums 31Y, 31M, 31C and 31K at a prescribed position on intermediate transfer belt 41 to be overlapped. When toner images each having a different color are superimposed, a color toner image is formed on intermediate transfer belt 41. The cleaning section deletes toners remaining on surfaces of photoconductor drums 31Y, 31M, 31C and 31K which have been terminated in terms of transfer of toner images.

On the other hand, second transfer roller 42 transfers a color toner image transferred onto intermediate transfer belt 41 to be superimposed onto sheet P that is conveyed from trays PG1, PG2 and PG3 of sheet feeding section 108, and is fed out while being synchronized by sheet feeding roller 81. The belt cleaning section cleans a surface of the intermediate transfer belt 41 which has finished transferring of a color toner image onto sheet P, and the intermediate transfer belt 41 thus cleaned is ready for the next image transfer.

Incidentally, on a circumference of the second transfer roller 42, there is provided a color sensor (IDC sensor 25) that measures a color toner image formed on the intermediate transfer belt 41.

Sheet P that is carrying a color toner image is sent to fixing section 115 where the sheet P is pressed and heated and the color toner image is fixed on the sheet P.

The sheet ejection reversing section conveys sheet P which has finished fixing processing by the fixing section 115, and ejects the sheet P toward the relay unit RU. When ejecting sheet P by reversing it inside out, sheet ejection guide 62 guides the sheet P downward temporarily, and after the rear edge of the sheet P is interposed by sheet ejection reversing roller 63, the sheet P is reversed and conveyed, and the sheet ejection guide 62 guides the sheet P to sheet ejection roller 64 for sheet ejection.

Incidentally, when forming an image also on the other side of sheet P, the sheet ejection guide 62 conveys the sheet P that has finished fixing processing for a toner image on a surface to sheet-re-feeding section 117 that is positioned at a lower part, and after the rear edge of the sheet P is interposed by sheet-re-feeding reversing roller 71, the sheet P is sent oppositely to be reversed, and is sent out to sheet-re-feeding conveyance path 72 to be ready for image forming on the other side of the sheet P.

The sheet P ejected from the image forming apparatus main body 12 is conveyed to relay unit RU in the next step.

On the other hand, the relay unit RU has therein first conveyance section 100 that receives sheet P ejected from image forming apparatus main body 12 to convey it, sheet humidifying device 120 that gives moisture to sheet P, second conveyance section 150 that receives sheet P ejected from the image forming apparatus main body 12 to convey it, first decurl section 160 that corrects curls of sheet P, second decurl section 170, third decurl section 180, color sensor 15 representing an example of a density sensor that measures an image formed on sheet P, sheet ejection conveyance section 200 that conveys sheet S that has passed through the color sensor 15 to eject to sheet ejection tray 61 and water storage tank 130 that stores water used by the sheet humidifying device 120.

Sheet P carried in relay unit RU from the image forming apparatus main body 12 is conveyed to the second conveyance section 150 from the first conveyance section 100, or is conveyed to the sheet humidifying device 120 from the first conveyance section 100, by the switching actions of a switching gate. Sheet P which has passed through the second conveyance section 150 and sheet P which has passed through the sheet humidifying device 120 are curl-corrected respectively at the first to third de-curling sections 160, 170 and 180. After that, the sheet P is ejected on sheet ejection tray 61 through sheet-ejection conveying section 200, after being measured by color sensor 15 in terms of an image.

The control section 27 has therein ROM (Read Only Memory), CPU (Central Processing Unit), RAM (Random Access Memory) that offers data storing area for working, a memory device (a hard disc) a user interface (an operation panel) and a bus. The ROM stores program data that can be practiced by control section 27 in addition to system program data for controlling the whole of the image forming apparatus. After a power supply of the image forming apparatus is turned on, CPU reads out system program data from ROM to start a system, and controls the whole of the image forming apparatus. The bus is connected to ROM, CPU, RAM and to hard discs to form a transmitting circuit (control bus and data bus).

An operation panel is composed of a touch panel wherein a matrix switch is combined with a display monitor such as, for example, a liquid crystal display device (LCD). Further, the operation panel has both a function as a display section that displays an operation screen of the image forming apparatus and a function as a setting section that receives input of various types of setting by pressing-down actions for matrix switch by an operator (user).

A specific example of constitution for color sensor 15 arranged in relay unit RU in FIG. 1 will be explained by referring to FIG. 2A. The color sensor 15 represents an example of a density sensor that measures image IP composed of a toner image formed on a surface of sheet P and outputs a measured value corresponding to density of the image IP. The color sensor 15 is equipped with LED group 51 that irradiates light of plural wavelength bands on a surface of sheet P, lens 55 that concentrates light reflected on a surface of a sheet, photodiode 54 that detects light concentrated by lens 55, a detection substrate that supports the photodiode 54 and with holder 52 that surrounds LED group 51, lens 55 holder 52 and photodiode 54. The LED group 51, for example, is composed of red LED that emits red light, green LED that emits green light and of blue LED that emits blue light. Each of beams emitted from LED group 51 has directivity respectively, and enters sheet P obliquely against a surface of the sheet P. And, lens 55 concentrates reflected light that is reflected in the direction of a normal on a surface among reflected beams which are reflected on a surface of the sheet P, on light-receiving surface of photodiode 54.

Figures 2A, 2B:
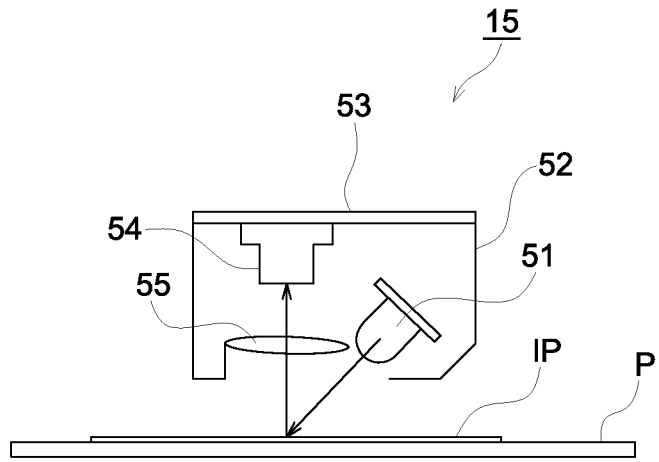

Characteristics of color sensor 15 are like those shown in the table in FIG. 2B. Namely, luminous intensity (mcd) of red LED is 5500 to 9300, that of green LED is 1200 to 21000 and that of blue LED is 4200 to 7200. Respective wavelength bands (nm) are 620 to 640, 528 to 536 and 464 to 472. Each of directive characteristics is 15±7.5°. Objects to be detected are C color, BK color, M color and Y color.

Next, actions of an image forming apparatus shown in FIG. 1 and of the second density sensor will be explained. The actions are divided into "actions in the case of registering sheet category", "actions in the case of generating γ correction curve" and "actions in the case of practicing a job".

(1) First, actions in the case of registering sheet category will be explained by referring to FIG. 3A-FIG. 3C. A prescribed chart image for detecting color sensor (an example of a prescribed test image) is formed on sheet Pt (S01 in FIG. 3B). A test chart image is measured by using color sensor 15 in relay unit RU (S03 in FIG. 3B). Owing to this, a measured value (measured voltage) corresponding to the density of the test chart image is outputted from color sensor 15. Data of the measured value thus outputted are stored in a hard disc in control section 27.

(2) Then, the test chart image is measured by using colorimeter 73 that is an example of the second density sensor (S05 in FIG. 3B). Owing to this, the density of this test chart image is outputted from the colorimeter 73. The colorimeter 73 is an equipment that is arranged outside the image forming apparatus and is different from the image forming apparatus. Therefore, data of density outputted from the colorimeter 73 are stored in a recording medium such as a nonvolatile memory (S07 in FIG. 3B). The recording medium that stores these data is inserted into a reading drive equipped on the image forming apparatus main body 12, and these data are stored in a hard disc in the control section 27.

Figure 3A:
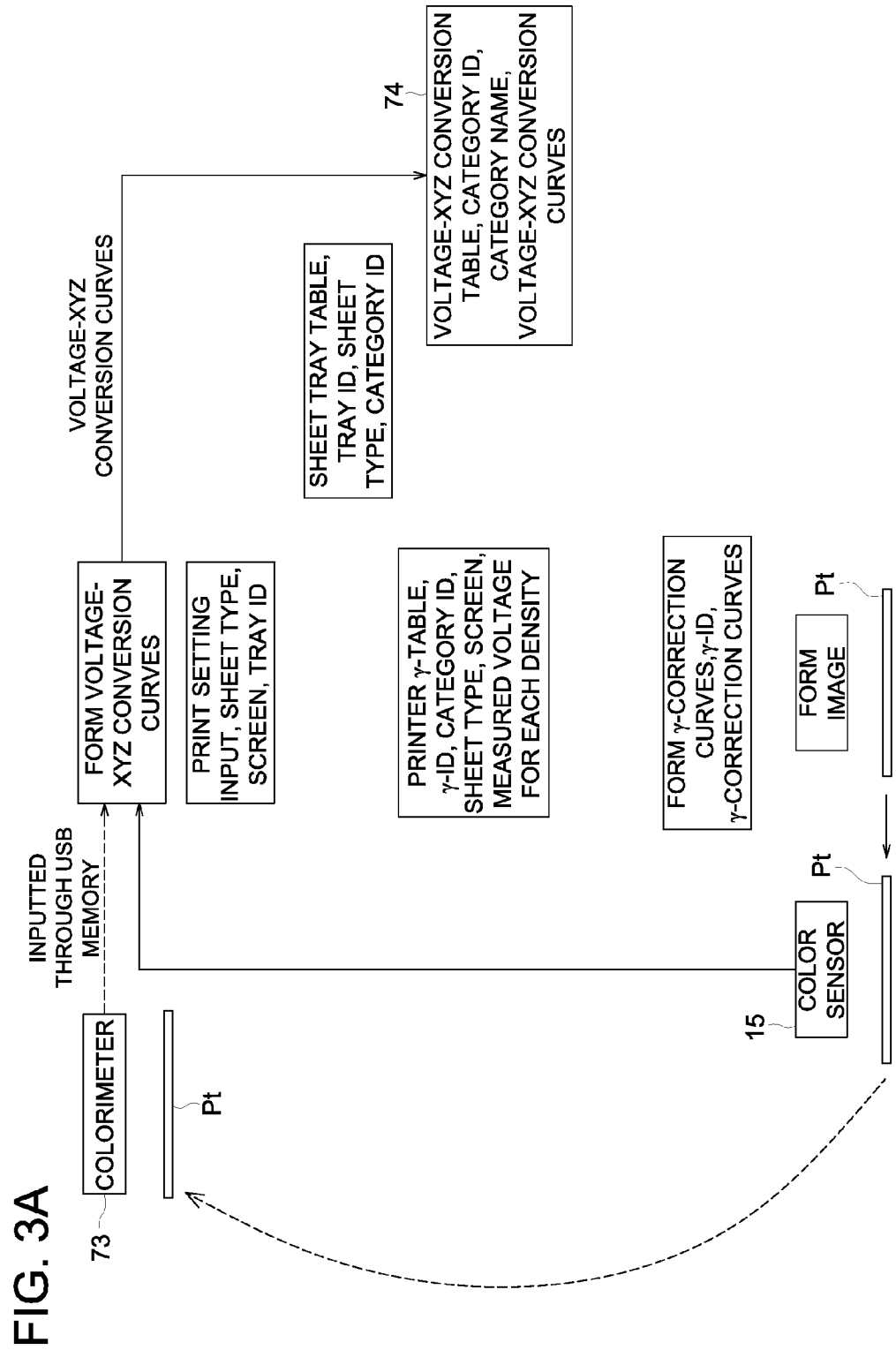
FIG. 3A shows a data flow diagram showing a flow of various types of data in the case of registering sheet category.

(3) The control section 27 serving as a conversion curve registering section (an example of a conversion data storing section) prepares a conversion curve (voltage—XYZ conversion curve) as an example of conversion data, by causing a measured value outputted from color sensor 15 and density data outputted from the colorimeter 73 to correspond to each other (S09 in FIG. 3B). In this case, the conversion curve represents a plurality of data group showing relationship between measured value (voltage) outputted from color sensor 15 and image density. And, the conversion curve registering section stores the conversion curve in a hard disc that serves as a conversion curve storing section (an example of a conversion curve storing section) (S09 in FIG. 3B). The control section 27 prepares a conversion curve for each of sheet types and for each of image screens. Therefore, plural conversion curves are stored in the hard disc for each of sheet types and for each of image screens. As is shown in FIG. 3A, plural conversion curves are stored as conversion table 74 (voltage—XYZ conversion table) that is discriminated by category ID. Sheet category names and conversion curves are stored, corresponding to the category ID.

FIG. 3C shows an example of display for operation panel in the case of registering a sheet category. Categories ID "No. 01" and "No. 02" and sheet category names "Paper Type 01" and "Paper Type 02 as well as a date of setting" are mentioned. With respect to "Paper Type 02", there is mentioned that the state is waiting colorimetric data as density data outputted from the colorimeter 73. When "the colorimetric data reading" button is pressed down by inserting a recording medium that stores colorimetric data into the reading drive that is equipped on the image forming apparatus, preparing and registering for a conversion curve (S09) are carried out.

As stated above, a user can prepare and register the conversion curve in advance, concerning various combinations between a sheet type (plain paper or glossy paper) to be used by the user and the image screen to be formed by the user. The screen is selected by the image forming apparatus, depending on attributes of images formed on the sheet (photographic images, character images, dots and lines).

Figure 4A:
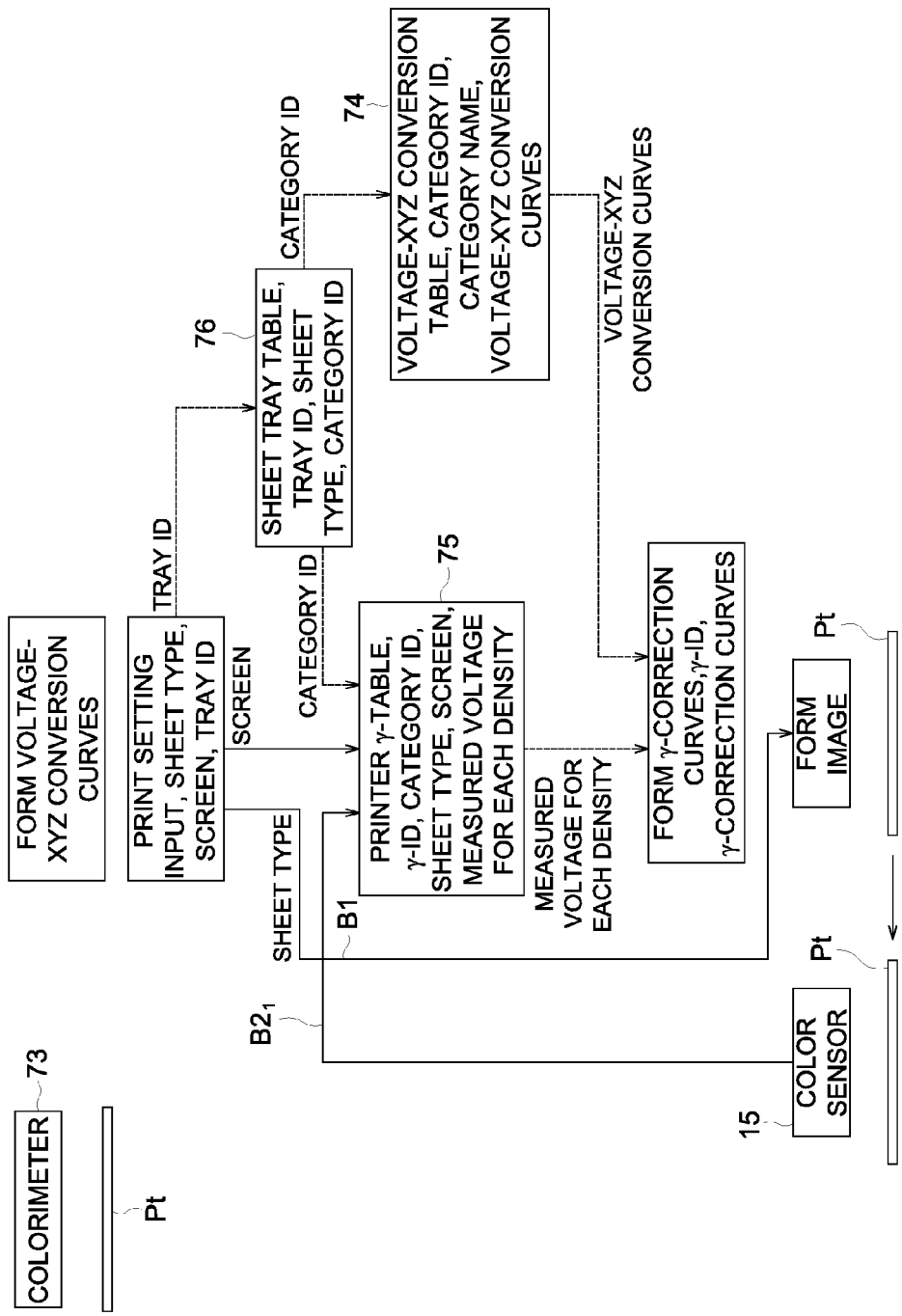
FIG. 4A is a data flow diagram showing a flow of various types of data in the case of generating γ correction curve.

(1) Next, actions in the case of generating γ correction curve will be explained by referring to FIGS. 4A-4C. First, a user selects a sheet category to be used by the user, on the screen for the output sheet density manual adjustment shown on FIG. 4C (S21 of FIG. 4B). As is shown in FIG. 4A, the control section 27 detects category ID corresponding to the selected sheet category. The control section 27 serving as a conversion curve selecting section (an example of conversion data selecting section) retrieves plural conversion curves (conversion table 74) based on the detected category ID, and selects at least one conversion curve corresponding to the detected category ID. In this way, the control section 27 selects a conversion curve corresponding to tray ID in image forming processing that is received from a user. Incidentally, in the case of manual correction, stage S21 is needed, but in the case of automatic correction, conditions of the job in the course of being practiced have priority.

Figure 4B:
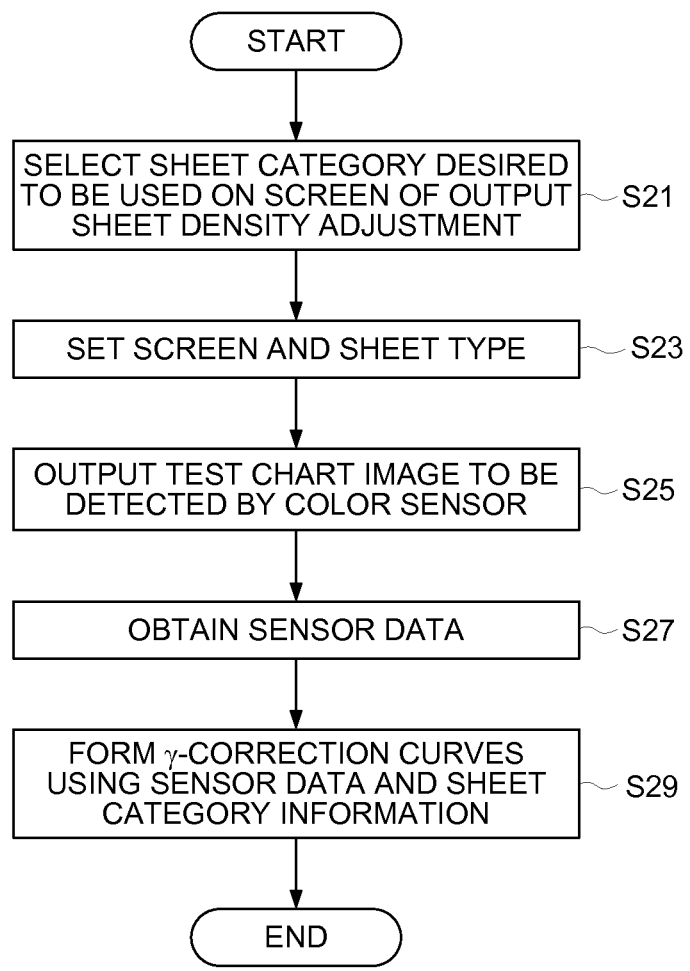
FIG. 4B is a flow chart showing an operation order in the case of generating γ correction curve.

(2) A sheet type and a screen are established by a user (S23 of FIG. 4B). Next, a test chart image (a prescribed image) is formed on sheet Pt based on the established sheet type and screen, without applying γ correction (B1 of FIG. 4A, S25 of FIG. 4B).

(3) Color sensor 15 in relay unit RU is used to measure the aforesaid test chart image. Due to this, a measured value corresponding to density of this test chart image is outputted from the color sensor 15. Then, the measured value for each density is caused to be connected with category ID, a sheet type and with a screen, to be stored in a hard disc (measured value data storing section) in the control section 27. Printer γ is composed of a combination of a measured value for each density, category ID, a sheet type and a screen.

(4) The control section 27 (density adjusting section) generates a γ correction curve by using the conversion curve selected in S21 in FIG. 4B and by using printer γ prepared in S27 of FIG. 4B (S29 of FIG. 4B).

The control section 27 prepares printer γ for each type of a sheet and for each screen. Therefore, plural printers γ and γ correction curves are stored for each sheet type and for each image screen. As is shown in FIG. 4A, plural printers γ are stored as printer γ table 75 which is discriminated by γID. Further, plural γ correction curves generated in S29 of FIG. 4B are also stored in a hard disc as data discriminated by the same γ ID. Namely, printer γ and γ correction curve that corresponds to the printer γ are discriminated by the same γID.

In this way, a user can prepare and register printer γ and γ correction curve in advance, concerning various combinations of sheet types to be used and image screens to be formed. By preparing γ correction curves in advance, it is possible to improve a processing speed for image correction in the case of practicing the following jobs.

Figure 5A:
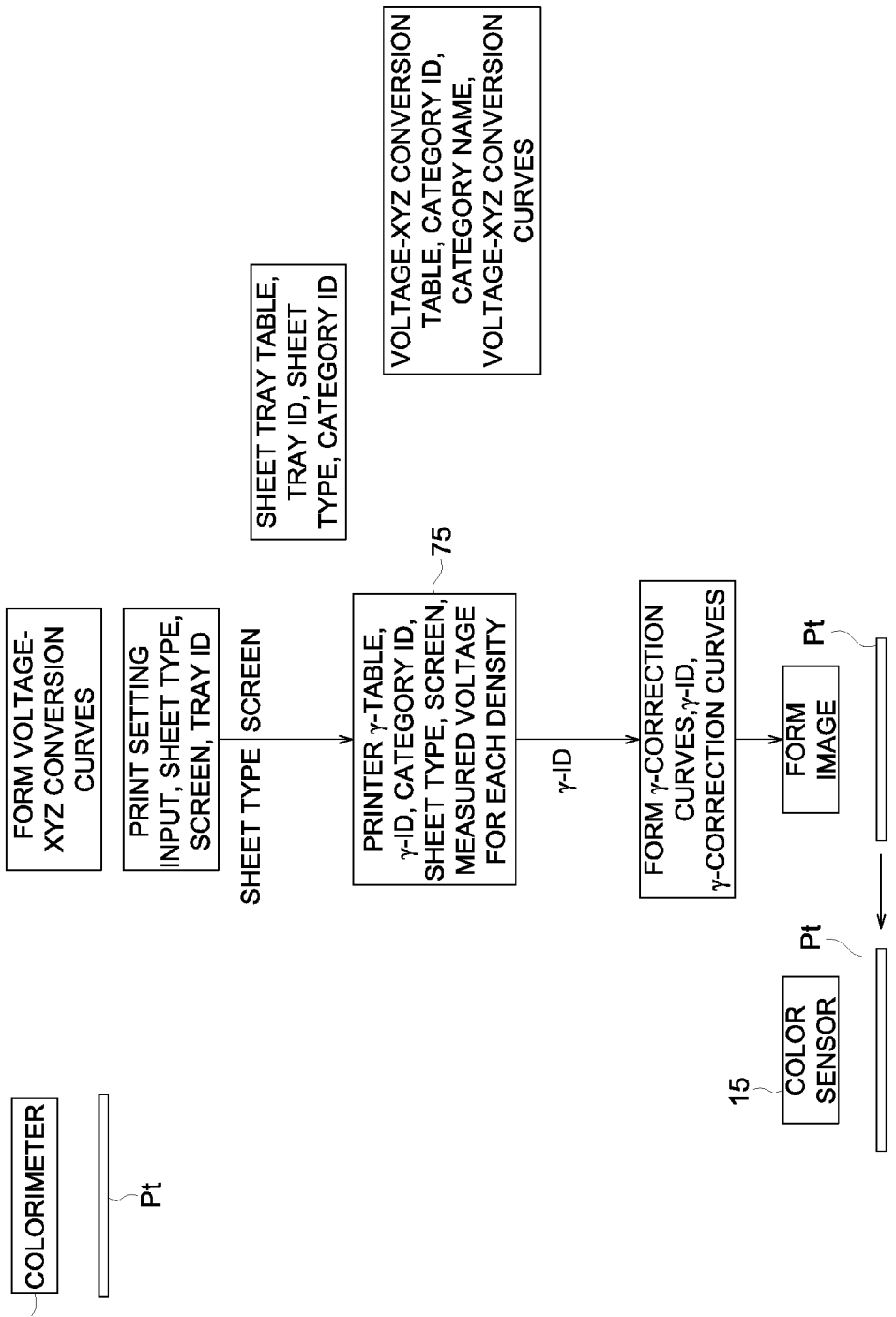
FIG. 5A is a data flow diagram showing a flow of various types of data in the case of practicing a job.

Next, actions in the case of practicing a job will be explained by referring to FIG. 5A-FIG. 5C. "The job" in this case means a unit of processing wherein image forming apparatus main body 12 and relay unit RU are printable under the same action mode, and the job means a unit of processing wherein a sheet type and a screen or either one of them is changed in terms of a kind.

Figure 5B:
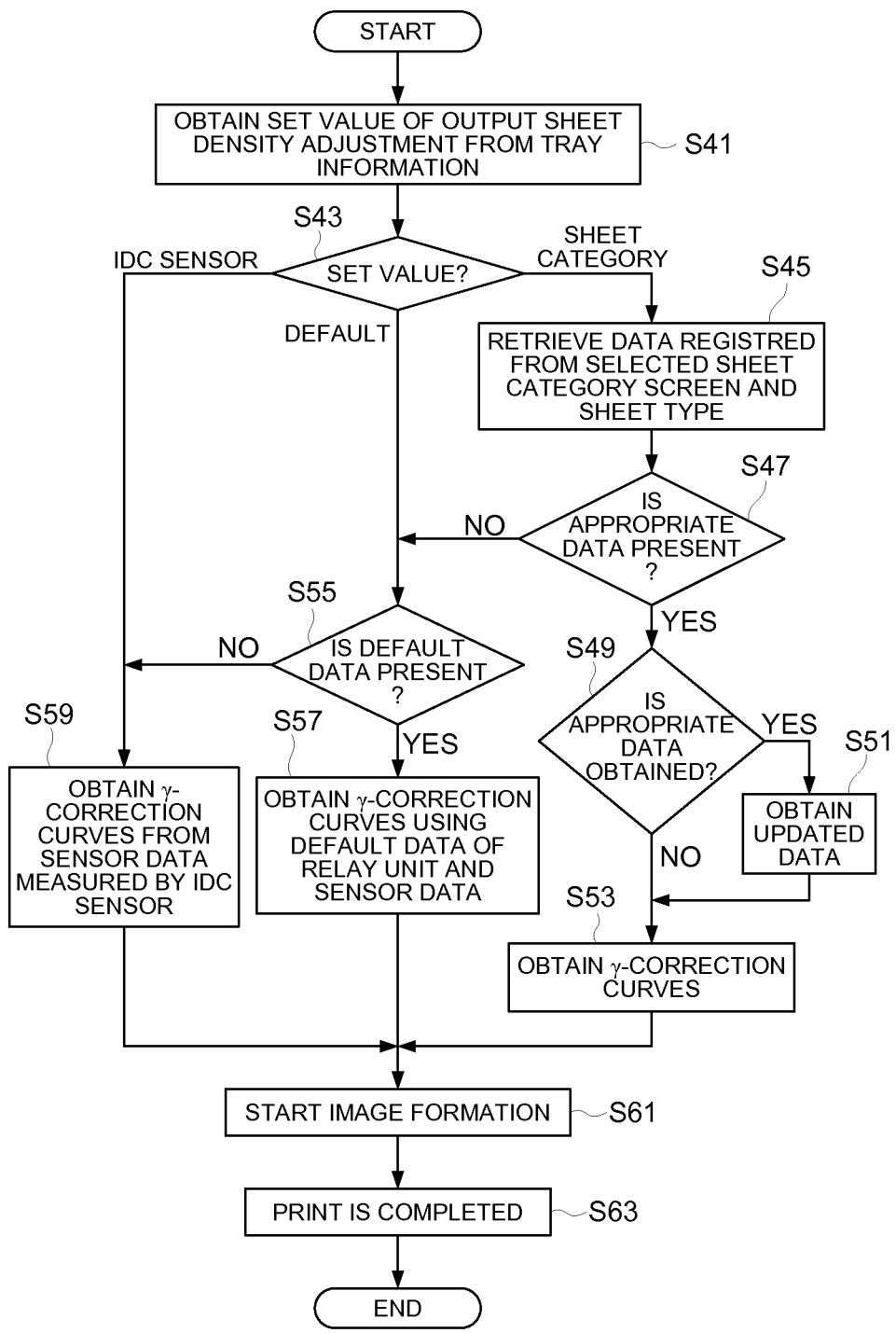
FIG. 5B is a flow chart showing an operation order in the case of practicing a job.

(1) First, an established value of output sheet density adjustment is acquired from tray information (S41 in FIG. 5B). The established value of the output sheet density adjustment in this case is either one of "default correction value", "sheet category" and "OFF" which are selected by a user in advance, in the screen of output sheet density adjustment setting shown in FIG. 5C.

(2) When the established value is "sheet category" ("sheet category" in S 43 in FIG. 5B), the flow advances to S45, and printer γ table 75 is retrieved from the selected sheet category and from sheet type and screen in the job designated by a user from an operation panel (S45 in FIG. 5B). When the corresponding γ ID is acquired as a result of retrieving printer γ table 75 (YES in S47 of FIG. 5B), the flow advances to S49, while, when the corresponding γ ID is not acquired (NO in S47 of FIG. 5B), the flow advances to S55. Further, when the corresponding γ ID is acquired (YES in S49 stage), γ ID of the newest prepared printer γ is acquired (S51). The flow advances to 853, and γ correction curve that is discriminated by the acquired γ ID is obtained.

(3) On the other hand, when the established value is "default" ("default" in S43 of FIG. 5B), the flow advances to S55 stage, and a judgment is formed whether default data of printer γ are in existence or not. When the default data of printer γ are in existence (YES in S55), the flow advances to S57 stage, and γ correction curve is obtained by using a measured value outputted from color sensor 15 and by using default data of printer γ. After that, the flow advances to S61 stage. When the default data of printer γ are not in existence (NO in S55), the flow advances to S59 stage.

(4) Further, when the established value is "OFF" ("IDC sensor") in S43 of FIG. 5B), the flow advances to S59 stage, and γ correction curve is obtained by using IDC sensor in the image forming apparatus main body 12. After that, the flow advances to S61 stage.

(5) After that, the flow advances to S61 stage, and a job designated by a user is started. To be concrete, control section (density adjusting section) 27 in FIG. 1 conducts γ correction processing that uses the aforesaid obtained γ correction curve, for image data of document D that has been read by document reading section 101, and generates output image data Based on this output image data adjusted in terms of density, toner images in respective colors are formed on respective photoconductor drums 31Y, 31M, 31C and 31K, thus, an image is formed on sheet P through intermediate transfer section 104 in FIG. 1 and fixing section 115 (S63).

As explained above, the control section 27 (density adjusting section) generates printer γ from the measured value corresponding to the density of a test chart image (S27 in FIG. 4B), and generates γ correction curve by using this printer γ and a conversion curve selected in S21 in FIG. 4B (S29 in FIG. 4B). Then, the control section 27 conducts γ correction processing that uses the γ correction curve for the image data of document D in FIG. 1, and generates output image data.

Therefore, the control section (density adjusting section) 27 can conduct density adjustment for an image formed by the image forming apparatus main body 12 (image forming section) based on the measured value obtained by measuring a prescribed image (test chart image) formed on sheet P and on the conversion curve selected by the conversion curve selecting section.

As stated above, the embodiment of the invention makes it possible to obtain the following working effects.

It is possible to conduct appropriate density adjustment processing in accordance with a sheet type and an image screen.

In a hard disc (conversion curve storing section) in the control section 27, there are stored plural conversion curves which show relationship between a measured value outputted from color sensor 15 and image density, for each of a sheet type and an image screen. The control section 27 (conversion curve selecting section) selects at least one conversion curve from plural conversion curves stored in the conversion curve storing section. Then, the control section 27 (density adjusting section) conducts density adjustment based on the measured value obtained by measuring test chart image (prescribed image) formed on a sheet and on the selected conversion curve. Therefore, it is possible to conduct appropriate density adjustment based on a conversion curve corresponding to a sheet type and an image screen.

The control section 27 (conversion curve selecting section) selects a conversion curve that corresponds to a sheet type and an image screen in image forming processing received from the outside. Since it is possible to select an appropriate conversion curve corresponding to a sheet type and an image screen in the image forming processing received from the outside, such as a user interface of the image forming apparatus main body 12 and a personal computer connected to a network, it is possible to conduct an appropriate density adjustment processing.

Though the present invention has been disclosed by one embodiment as stated above, the statement and the drawings which represent a part of the disclosure should not be comprehended to limit the invention. Based on this disclosure, various types of substitutive embodiments, examples and application technologies will be clarified for those having ordinary skill in the art.

In the above embodiment, the present invention is described as the image forming system composed of the image forming apparatus main body 12 and the relay unit RU. However, an image forming apparatus in which the image forming apparatus main body 12 is integrally provided with a function in the relay unit RU, may be configured.

In S29 in FIG. 4B, there has been explained an occasion wherein control section 27 (density adjusting section) generates γ correction curve by using the conversion curve selected in S21 in FIG. 4B and by using printer γ prepared in S27 in FIG. 4B, to which, however, the invention is not limited. For example, control section 27 (measurement data selecting section) may select at least one printer γ (measured value data) corresponding to the sheet type and the image screen established by a user, from plural printer γ (measured value data) stored in hard disc (measured value data storing section). In this case, control section 27 (density adjusting section) conducts density adjustment, based on printer γ selected by measured value data selecting section (measured value data) and on the conversion curve selected by the conversion curve selecting section. Owing to this, it is possible to conduct density adjustment processing that is more appropriate, because it is possible to select appropriate printer γ (measured value data) corresponding to a sheet type and an image screen in image forming processing received from the outside.

Though there has been shown an occasion wherein conversion curve corresponding to category ID is selected by control section 27 (conversion curve selecting section), it is also possible to arrange so that the conversion curve designated by a user may be selected.

There have been explained occasions to prepare printer γ and γ correction curve and to register them in advance, concerning various combinations of types of sheets to be used and of image screens to be formed, to which, however, the invention is not limited. For example, it is also possible to prepare the γ correction curve, each time the actual job is practiced. In this case, it is not necessary to prepare and register the γ correction curve in advance, thus, a storage capacity equivalent to that quantity is not needed.

In this way, the invention includes various types of examples which are not described in this specification, which should be understood. Therefore, those which can limit the invention are only the specific matters relating to the appropriate claims based on the disclosure.

What is claimed is:

1. An image forming apparatus comprising:
    an image forming section that forms an image on a sheet;
    a first density sensor that measures the image formed on the sheet and outputs a measured value corresponding to a density of the image;
    a conversion data storing section that stores plural conversion data showing a relationship between the measured value outputted from the first density sensor and the image density, for each sheet type and each screen for an image;
    a conversion data selection section that selects at least one conversion data from the plural conversion data stored in the conversion data storing section;
    a density adjustment section that adjusts a density for an image formed by the image forming section based on a measured value acquired by measuring a prescribed image formed on a sheet and on the conversion data selected by the conversion data selection section; and
    a conversion data registering section that registers the conversion data on the conversion data storing section;
    wherein the image forming section forms a prescribed test image on a sheet by designating a sheet type and a screen for the image, then, the first density sensor measures the prescribed test image, and further, a second density sensor measures the prescribed test image, and then the conversion data registering section prepares the conversion data by causing the measured value outputted from the first density sensor to correspond to the density value outputted from the second density sensor.

2. The image forming apparatus of claim 1, wherein the conversion data selection section selects conversion data that correspond to the sheet type and the image screen in image forming processing received from an outside.

3. The image forming apparatus of claim 2, further comprising:
    a measured value data storing section that stores, for each sheet type and each image screen, plural measured value data composed of measured values for each density outputted from the first density sensor that measured images having prescribed density, and
    a measured value data selection section that selects at least one measured value corresponding to the sheet type and the image screen in the image forming processing received from the outside, from the plural measured value data stored in the measured value data storing section, wherein the density adjustment section adjusts the density based on the measured value data selected by measured value data selection section and on the conversion data selected by the conversion data selection section.

4. The image forming apparatus of claim 1, wherein the conversion data selection section selects conversion data designated by a user.

5. An image forming method comprising:
forming an image on a sheet by an image forming section;
measuring the image formed on the sheet by a first density sensor and outputting a measured value corresponding to a density of the image;
storing plural conversion data showing a relationship between the measured value outputted from the first density sensor and the image density, for each sheet type and each screen for an image, in a conversion data storing section;
selecting at least one conversion data from the plural conversion data stored in the conversion data storing section that corresponds to the sheet type and the image screen in image forming processing received from an outside; and
adjusting a density for an image formed by the image forming section based on a measured value acquired by measuring a prescribed image formed on a sheet and on the selected conversion data;
wherein the method further comprises:
registering the conversion data on the conversion data storing section;
forming a prescribed test image on a sheet by designating a sheet type and a screen for the image;
measuring the prescribed test image by the first density sensor; and
measuring the prescribed test image by a second density sensor; and
wherein the registering includes forming the conversion data by causing the measured value outputted from the first density sensor to correspond to the density value outputted from the second density sensor.

6. The image forming method of claim 5, further comprising:
storing, for each sheet type and each image screen, plural measured value data composed of measured values for each density outputted from the first density sensor that measured images having prescribed density;
selecting at least one measured value corresponding to the sheet type and the image screen in the image forming processing received from the outside, from the stored plural measured value data; and
adjusting the density based on the selected measured value data and on the selected conversion data.

7. The image forming method of claim 5, wherein the selecting includes selecting conversion data designated by a user.

8. An image forming system comprising:
an image forming apparatus main body that forms an image on a sheet; and
a relay unit having a first density sensor that measures the image formed on the sheet and outputs a measured value corresponding to a density of the image;
wherein the image forming apparatus main body comprises:
a conversion data storing section that stores plural conversion data showing a relationship between the measured value outputted from the first density sensor and the image density, for each sheet type and each screen for an image;
a conversion data selection section that selects at least one conversion data from the plural conversion data stored in the conversion data storing section;
a density adjustment section that adjusts a density for an image formed by the image forming apparatus main body based on a measured value acquired by measuring a prescribed image formed on a sheet and on the conversion data selected by the conversion data selection section; and
a conversion data registering section that registers the conversion data on the conversion data storing section;
wherein the image forming apparatus main body forms a prescribed test image on a sheet by designating a sheet type and a screen for the image, then, the first density sensor measures the prescribed test image, and further, a second density sensor measures the prescribed test image, and then the conversion data registering section prepares the conversion data by causing the measured value outputted from the first density sensor to correspond to the density value outputted from the second density sensor.

9. The image forming system of claim 8, wherein the conversion data selection section selects conversion data that correspond to the sheet type and the image screen in image forming processing received from an outside.

10. The image forming system of claim 9, wherein the image forming apparatus main body further comprises:
a measured value data storing section that stores, for each sheet type and each image screen, plural measured value data composed of measured values for each density outputted from the first density sensor that measured images having prescribed density; and
a measured value data selection section that selects at least one measured value corresponding to the sheet type and the image screen in the image forming processing received from the outside, from the plural measured value data stored in the measured value data storing section, wherein the density adjustment section adjusts the density based on the measured value data selected by measured value data selection section and on the conversion data selected by the conversion data selection section.

11. The image forming system of claim 8, wherein the conversion data selection section selects conversion data designated by a user.

* * * * *